United States Patent [19]

Matton

[11] Patent Number: 4,723,397
[45] Date of Patent: Feb. 9, 1988

[54] HARVESTERS FOR HARVESTING HERBAGE, CEREALS OR OTHER STANDING PLANTS

[76] Inventor: Christian Matton, 12 rue du Blocus, Merignies, 59710 Pont A Marcq, France

[21] Appl. No.: 833,243

[22] Filed: Feb. 27, 1986

[30] Foreign Application Priority Data

Mar. 1, 1985 [FR] France ............................ 85 03476

[51] Int. Cl.⁴ ........................................... A01D 41/06
[52] U.S. Cl. ....................................... 56/14.6; 56/364
[58] Field of Search ............ 56/14.6, 126, 128, 328 R, 56/364; 130/27 AB

[56] References Cited

U.S. PATENT DOCUMENTS

| | | | |
|---|---|---|---|
| 3,945,178 | 3/1976 | Delfosse et al. | 56/14.6 |
| 3,961,465 | 6/1976 | Winings | 56/13.1 |
| 4,142,348 | 3/1979 | Jordan et al. | 56/364 |
| 4,227,538 | 10/1980 | Long et al. | 56/14.6 |
| 4,255,923 | 3/1981 | Spaida et al. | 56/364 |
| 4,367,622 | 1/1983 | Aron et al. | 56/364 |
| 4,438,619 | 3/1984 | Heim et al. | 56/364 |
| 4,453,373 | 6/1984 | De Coere | 56/364 |
| 4,495,756 | 1/1985 | Greiner et al. | 56/364 |

*Primary Examiner*—Stephen J. Novosad
*Assistant Examiner*—William P. Neuder
*Attorney, Agent, or Firm*—Dennis P. Clarke

[57] ABSTRACT

The invention relates to improvements to a harvester, particularly a harvester for harvesting herbage, cereals, or other plants.

The harvester comprises a cutting device (2) followed by means (6) for channelling the ears toward an elevator conveyor (7) towards processing means more particularly thrashing means.

It is characterized by the fact that it further comprises, at the rear of the cutting device (2), at least one means for gathering up the grains and ears left on the ground, which device covers a width substantially equal to the cutting device (2).

10 Claims, 1 Drawing Figure

U.S. Patent
Feb. 9, 1988
4,723,397
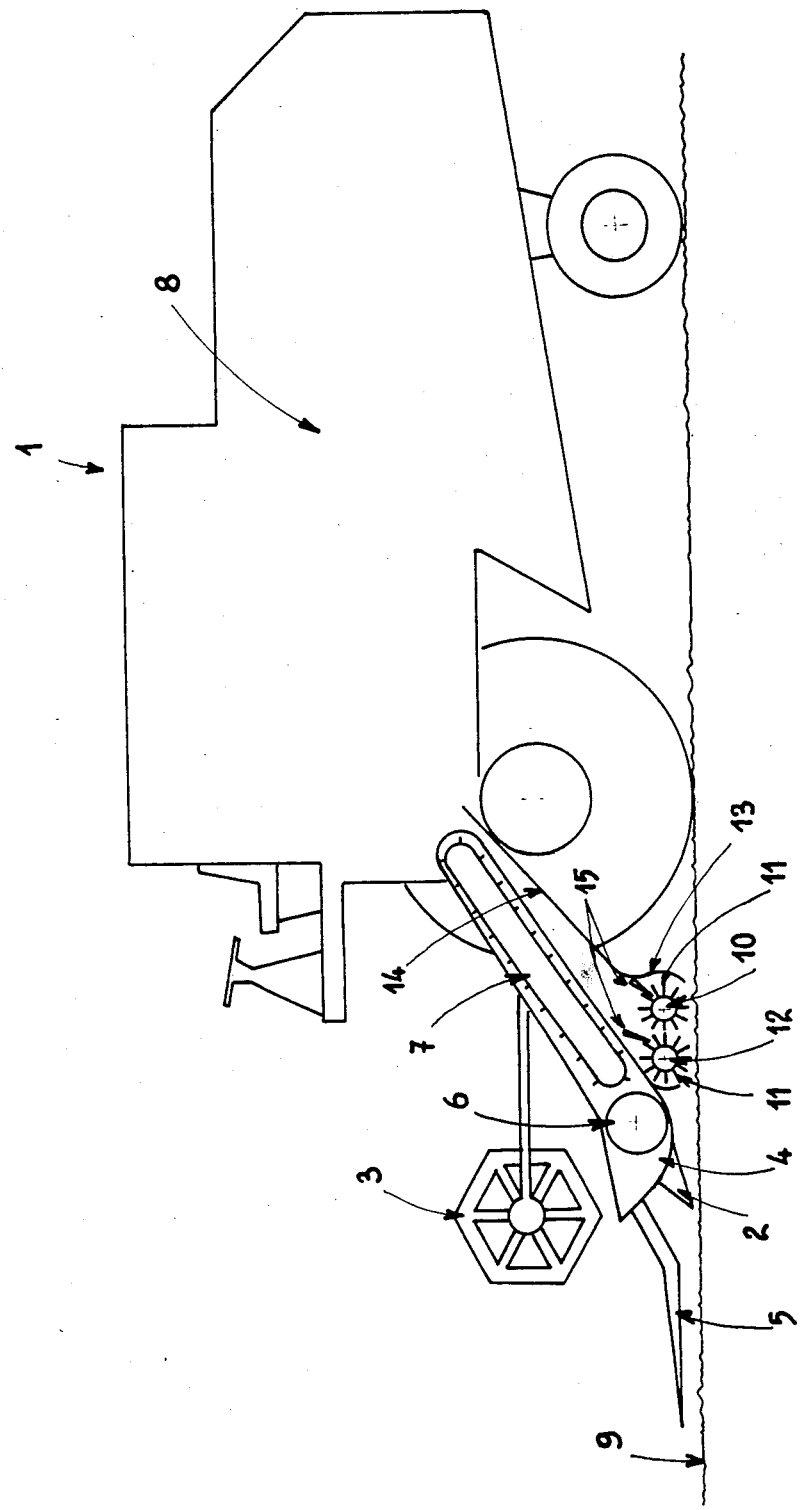

HARVESTERS FOR HARVESTING HERBAGE, CEREALS OR OTHER STANDING PLANTS

The present invention relates to improvements to harvesters for harvesting herbage, cereals or other standing plants.

It is a practically generalized practice at the present time to harvest cereals, herbage and in general all standing plants by means of a combine harvester whose main functions are to cut the stems, separate the grain from the ears and to store the grain at least temporarily.

Depending on the type of machine, after separation of the grain, the stems are spread over the ground, possibly after being chopped up, or else they are compressed into bundles.

The most widely used combine harvesters are self driven or are hitched to a vehicle such as a tractor, and they have mainly a device for cutting the stems, such for example as a transverse blade with, possibly, a means for beating back the stems and a cutting table at the rear of the cutting device.

Then we find means such for example as a drum with one or two helical screws at its periphery, which gather the cut stems together and channel them into a chute where they are taken over by a conveyor towards the thrashing means.

These machines give good results but nevertheless leave on the ground a certain amount of ears which have not been harvested, more particularly those which have been broken by storms, those which are too ripe and whose grains have fallen themselves, and the ears which have been laid flat or crushed.

In some cases, the amount of unharvested ears may be estimated at 100 kilos per hectare.

These ears which remain on the ground among the stubble raise problems. In fact, it is sometimes necessary after harvesting to plough in the stubble, and simultaneously, the ears and the grains remaining on the ground, which causes them to sprout.

This means then going over the field again with a tool which results in a considerable waste of time.

In addition, when there is a change of crop for the next harvest, for example, a crop of winter barley after a crop of wheat, selective treatments are required for isolating the two crops from each other.

Finally, the major disadvantage is that diseases may be passed from one crop to the other, through the grains and ears which remains on the ground.

One of the aims of the present invention is to overcome these disadvantages and to provide a harvester which leaves on the ground only a quite limited amount of grains and ears behind it.

Another aim of the present invention is to provide a harvester which further improves the yield of the harvest, to provide good isolation between two sucessive crops and so to minimize the risk of passing diseases from one crop to the other.

Another aim of the present invention is to provide a harvester which avoids having to plough in the stubble and to carry out selective treatments for the next crop.

The harvester of the invention is characterized in that it comprises, behind the cutting device, at least one means for gathering up grains and ears left on the ground which covers a width substantially equal to the cutting device.

The invention will be better understood from the following description given by way of non limitative example with reference to the accompanying drawings which show schematically a side view of a combine harvester illustrating the improvements of the present invention.

The combine harvester 1 shown by way of illustration of the invention in the single FIGURE is of the self propelled type.

This naturally is only an example and, in a general way, the invention relates to any type of combine harvester whether self propelled or hitched to an existing vehicle for example a tractor.

The combine harvester 1 of the FIGURE is adapted for harvesting cereals, forage plants and other types of standing plants.

The work of the combine harvester consists of cutting the plants at the base of their stem, close to the ground, then directing the ears thus cut towards the processing, for example thrashing, means which separate the grains from the rest of the ears then discharge the straw rearwardly.

The combine harvester 1 shown in the FIGURE, comprises, in a way known per se, a transverse cutting device such as an oscillating blade whose width may reach four meters and more.

In front of the cutting device there may be provided a beater 3 which lays the ears towards the cutting table 4 of the combine harvester and one or more lateral dividers 5 which divide the cut crop from that remaining standing for the next passage.

Downstream of the cutting device 2 means, which are very often formed by a helical screw drum 6, gather the cut ears over the whole of the cutting device 2 into a narrower zone, where they are taken over by a conveyor shown schematically at 7 which conveys them to the thrashing means, not shown, which are situated in the body 8 of the combine harvester 1.

The combine harvester 1 further comprises any appropriate means for adjusting the position of the cutting device 2 with respect to the surface of the ground 9, as well as the height of the pick-up.

According to the invention, the combine harvester comprises behind the cutting device 2 at least one means for gathering up the grains and ears left on the ground, which means covers a width substantially equal to the cutting device 2.

In a preferred embodiment, the gathering up means is formed by at least one transverse roller 10 which covers a width substantially equal to the width of the cutting device 2.

The transverse roller 10 comprises over its periphery a plurality of teeth orientated approximately radially which are preferably flexible and which substantially skim the surface of the ground in the lower part of the roller.

Roller 10 is driven with a rotational movement in a direction opposite that of the wheels of the combine harvester 1, that is to say that the teeth 11 situated in the lower part of roller 10 tend to move forwards of the combine harvester 1.

This rotational movement means that the roller 10 sweeps the surface of the ground between the stubble when rising and recovers the ears and grains left on the ground.

Preferably, the combine harvester has two twin rollers 10 and 11 disposed substantially parallel to each other.

The two rollers 10 and 12 may have a parallel function, that is to say they may be driven in the same direction of rotation and be sufficiently spaced apart from each other for there to be no contact between the respective teeth.

In this case, it is also possible to dispose more than two rollers in parallel.

However, preferably, rollers 10 and 12 are disposed parallel to each other at a distance which means that the envelopes defined by the ends of their respective teeth are approximately tangential.

Moreover, their direction of rotation is opposite and roller 12 situated in front of roller 10 sweeps the ground when coming down whereas the rear roller 10 sweeps it when coming up.

Rollers 10 and 12 are supported by any appropriate means which are preferably adjustable in height so that the position of the teeth may be adjusted with respect to the ground in the lower part of the rollers.

Furthermore, they are rotated by any appropriate means, for example by a mechanical transmission connecting them to the main motor or else by an electric motor supplied directly from the battery or from an alternator.

The height of the two rollers 10, 12 is determined so that, in their lower part, the teeth substantially skim the surface of the ground.

Thus, the ears and grains which remain on the ground after the cutting device 2 has passed by are, as it were, swept by the two rollers 10, 12 and recovered at this level more particularly before the passage of the wheels and before the possible rearward discharge of straw from the harvester.

The teeth 11 which are preferably flexible have a height close to the height of the stubble left on the ground by the cutting device, so that the central part of the rollers is situated above the stubble and so that the teeth penetrate between the stubble and take with them the ears and grains left on the ground.

The ears and grains which are swept by rollers 10 and 12 are preferably recycled in the combine harvester upstream of the thrashing means.

For this, for example, rollers 10, 12 are surrounded by a casing 13 over which is mounted a hood 14 which channels the flow of grains and ears gathered up from the ground.

Hood 14 may issue at several possible positions, first of all, it may issue under the upper part of conveyor 7 at the level of the stone tank which is generally situated in this zone.

It may also issue laterally in the central part of conveyor 7 through one side or else through both sides.

The upper end of hood 14 may also issue in the central part of the conveyor in its return part.

In the upper part of rollers 10, 12, a comb 15 or any other appropriate means may be provided for releasing the ears and grains which are imprisoned between the teeth 11 of rollers 10, 12.

The rising movement of the ears and grains inside casing 13 and hood 14 is provided by any appropriate means;

In particular, this movement is facilitated by the air stirring effect provided by the teeth of the two rollers 10, 12 considering the reverse rotational movement of the two rollers.

The rising movement may also be promoted by suction or blowing means, such as a blower, or by mechanical conveying means, for example an endless screw or belt transporter.

It should be mentioned that rollers 10 and 12 operate over a width substantially equal to that of the cutting device 2 and that, as for this cutting device, it is necessary to gather the whole of the grains and ears over a smaller width before conveying them to the thrashing means.

This may be obtained by a judicious shape of casing 13 and hood 14, or by any mechanical means such as a drum similar to drum 6.

For promoting this effect the teeth may be disposed in helixes on the outer surface of rollers 10, 12 or else the rollers may be slanted in a horizontal plane.

Furthermore, when hood 14 is placed substantially in the axis of the machine, each roller 10, 12 may comprise two roller elements disposed in a "V" whose opening is turned towards the front of the machine and whose tip is turned towards the rear, that is to say towards the inlet of hood 14.

In the return path in the means for thrashing the grains and ears picked up from the ground, the harvester further comprises a sorting system removing the earth.

Naturally, the present description is only given by way of indication and other embodiments of the invention could be adopted without for all that departing from the scope and spirit thereof.

In particular, the improvements brought by the invention could be adapted to other agricultural machines than combine harvesters, that is to say generally to any harvesting machine which cuts the plants then recovers them for subsequent processing, rather than cutting them and leaving them on the ground.

Thus the invention may be applied to harvesting plants such as peas, beans, . . .

The term "harvester" should be understood in the widest sense and generally designates a harvesting machine.

I claim:

1. A harvester (1) for harvesting cereals, herbage or other standing plants, comprising:
   a cutting device (2) comprising a transverse cutting blade having a predetermined width,
   ahead of said cutting device (3) a beating device having means for positioning the plants in the direction of the cutting device,
   downstream of the cutting device a conveyor (6) with means for channeling the stems and ears cut by the cutting device towards a lifting conveyor (7) for transporting said harvested plants,
   means (8) for receiving said plants from said conveyor (7) and processing said harvested plants,
   said harvester characterized by having collecting means for material left on the ground after cutting,
   said collecting means being placed behind the transverse cutting device and,
   comprising in combination:
     at least one transverse roller (10) of a width substantially equal to the width of the cutter of the harvester and having at its periphery a plurality of teeth (11) which substantially skim the surface of the ground in the lower part of the roller, said roller being driven with a rotational movement in a direction such that in the lower part of the roller said teeth move towards the front of the harvester (1) and,
     at the outlet of said transverse roller, conveyor means adapted and disposed such that the material collected by the said transverse roller are gathered ahead of the processing means.

2. Harvester according to claim 2, characterized by the fact that, at the rear of the cutting device (2) but in front of at least one of the above rollers (10), it comprises a second roller (12) parallel to the preceding one, rotating in the same direction as it but spaced apart therefrom by a distance sufficient for their respective teeth not to enter in contact with each other.

3. Harvester according to claim 1, characterized by the fact that, at the rear of the cutting device (2) but in front of at least one of the above rollers (10), it comprises a second roller (12) parallel to the preceding one rotating in a direction opposite said preceding roller and so rotating so as to work when coming down whereas the preceding roller works when going up.

4. Harvester according to any one of claims 1, 2 and 3, characterized by the fact that the conveying means consist of at least one screw transporter.

5. Harvester according to any one of claims 1, 2 and 3, characterized by the fact that each roller (10, 12) has flexible teeth, oriented substantially radially, whose length is close to the mean length of the stubble left by the cutting device (2).

6. Harvester according to claim 1, characterized by the fact that it further comprises about the rollers (10, 12) a casing (13) on which is mounted a hood (14), which channels the ears and grains gathered up by the rollers 10, 12).

7. Harvester according to claim 6, characterized by the fact that the hood (14) issues in its upper part at the level of the upper end of the elevator conveyor (7).

8. Harvester according to claim 6, characterized by the fact that the upper end of the hood (14) issues laterally in the central zone of the elevator conveyor (7).

9. Harvester according to any one of claims 6 to 8, characterized by the fact that it further comprises suction means promoting the rising movement of the ears and grains inside the hood (14).

10. Harvester according to any one of claims 6 to 8, characterized by the fact that it further comprises blowing means promoting the rising movement of the ears and grains inside the hood (14).

* * * * *